United States Patent [19]

Miller

[11] Patent Number: 4,926,561
[45] Date of Patent: May 22, 1990

[54] TRIPOD STAND FOR A SURVEYOR'S ROD

[76] Inventor: Donald P. Miller, 9239 S. 19th Ave., Phoenix, Ariz. 85041

[21] Appl. No.: 289,329

[22] Filed: Dec. 22, 1988

Related U.S. Application Data

[63] Continuation-in-part of Ser. No. 59,568, Jun. 8, 1987, Pat. No. 4,803,784.

[51] Int. Cl.$^5$ .............................................. G01C 15/00
[52] U.S. Cl. ........................................ 33/293; 33/295
[58] Field of Search .................. 33/293, 295, 296, 299

[56] References Cited

U.S. PATENT DOCUMENTS

| | | |
|---|---|---|
| 522,391 | 7/1894 | Walker . |
| 1,194,772 | 8/1916 | Newman et al. . |
| 1,290,830 | 1/1919 | Fungo-Giera . |
| 1,934,223 | 10/1933 | Booth . |
| 2,260,995 | 10/1941 | Kruczek . |
| 2,580,350 | 12/1951 | Friedberg . |
| 2,775,423 | 12/1956 | Strass . |
| 2,788,578 | 4/1957 | Digiacinto . |
| 3,685,162 | 8/1972 | Haun . |
| 3,730,470 | 5/1973 | Mitchell . |
| 3,911,589 | 10/1975 | Myeress . |
| 4,490,919 | 1/1985 | Feist . |
| 4,527,339 | 7/1985 | Brunson . |
| 4,543,729 | 10/1985 | Holbrook . |

*Primary Examiner*—Harry N. Haroian
*Attorney, Agent, or Firm*—Cahill, Sutton & Thomas

[57] ABSTRACT

A portable stand having a frictionally adjustable receiver for a surveyor's rod permits plumbing of the rod and maintains the rod vertical and stationary with respect to a point on the ground.

25 Claims, 2 Drawing Sheets

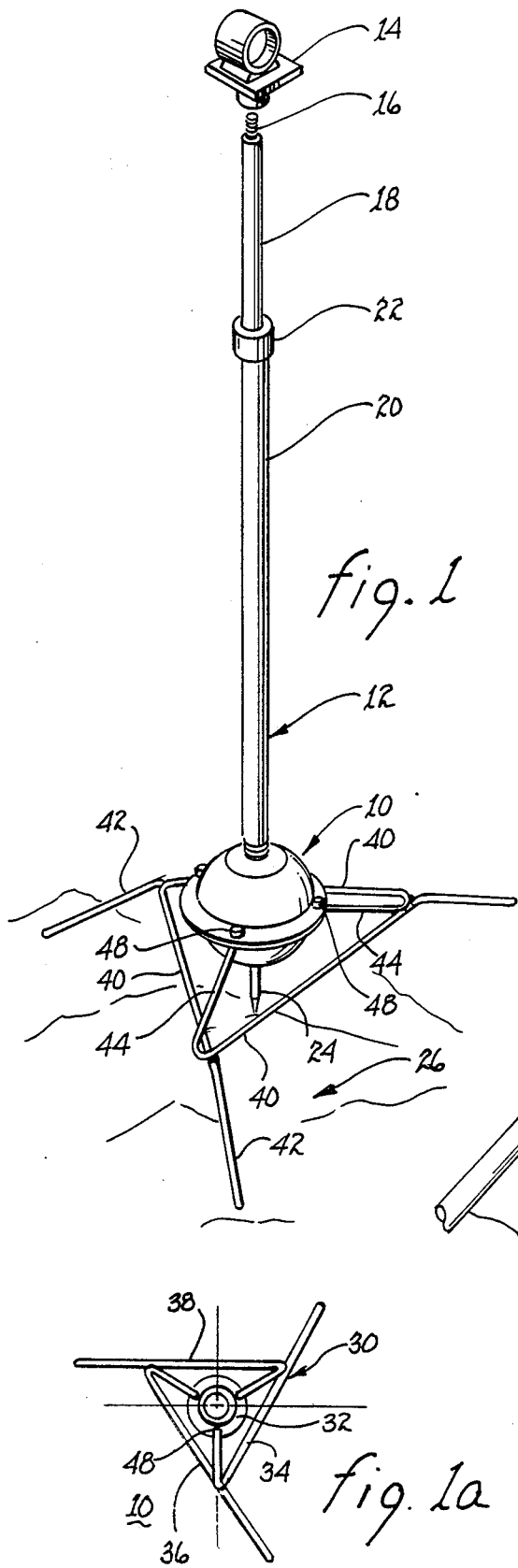
fig. 1
fig. 1a
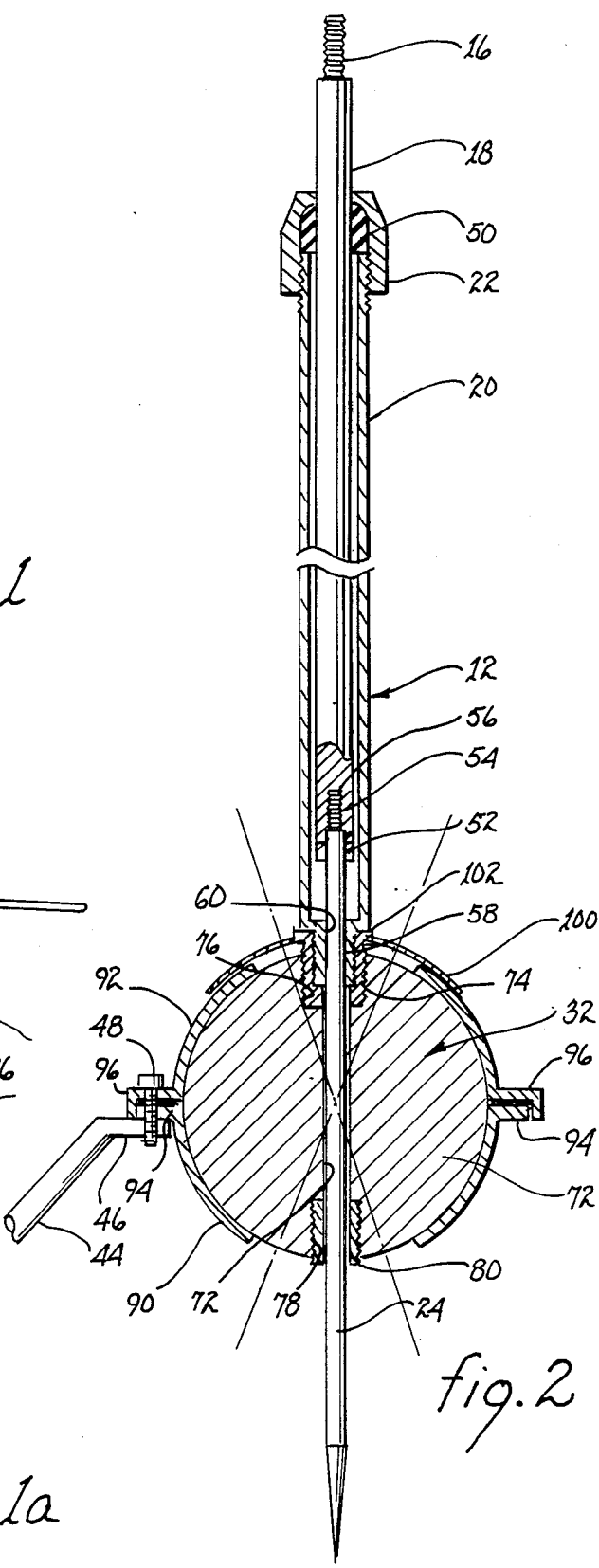
fig. 2

TRIPOD STAND FOR A SURVEYOR'S ROD

REFERENCE TO RELATED PATENT APPLICATIONS

This is a continuation-in-part application of a copending application entitled "PORTABLE STAND FOR A SURVEYOR'S ROD", Ser. No. 059,568, filed June 8, 1987, now U.S. Pat. No. 4,803,784 and describing an invention by the present inventor.

BACKGROUND OF THE INVENTION

1. Field of the Invention

The present invention relates to surveyor's tools and, more particularly, to a stand for a surveyor's rod.

2. Description of the Prior Art

Traditionally, a surveyor has a rod man whose function it is to hold a rod precisely vertical at a specific location upon the ground. Unless the rod is maintained precisely vertical, errors will be introduced. Relatively modern surveying equipment includes the use of a prism or reflector upon the rod to reflect an emitted beam. Again, accuracy in maintaining the rod stationary and vertical during the taking of readings is of paramount importance. Sometimes, due to fatigue or difficult terrain, a rod man may have difficulty maintaining a rod immobile and vertical for a sufficient period of time to obtain an accurate reading, which reading may require 30 seconds to 5 minutes or more. Even the most conscientious rod man will inadvertently permit minor oscillations of the rod during a reading. Moreover, during a reading, the rod man is not available to attend to other matters nor is he free to rest.

One solution used in the field to maintain the rod steady and plumbed is that of using a tripod with adjustable length legs to support the rod. This solution is very effective and the time necessary to obtain the measurements are of no moment. However, it is time consuming to set up and plumb the tripod and it cannot be easily carried from place to place. Furthermore, certain terrain may preclude the use of a tripod due to the horizontal space required and the necessity for a footing for each of the tripod legs or points.

Various other prior art surveyor's rod tools and devices are described in the following documents. U.S. Pat. No. 2,788,578 describes a support for a surveyor's rod, which support lockingly receives the rod. Three adjustable legs extend downwardly from the support, which legs can be adjusted to maintain the rod plumb. U.S. Pat. No. 3,685,162 is directed to a support apparatus for a rod which includes means for lockingly receiving the lower tip of the rod and a pair of legs having height adjustment means to permit repositioning the rod to vertical; a bubble attached to the support provides an indication of the degree of plumbness of the rod. U.S. Pat. No. 4,527,339 is directed to an optical target having a ball and cup support arrangement. Vertical positioning and maintenance in such position may be effected by two or more legs extending downwardly and laterally of a shaft portion of the target. U.S. Pat. No. 4,490,919 describes spikes connected to bases for supporting guides usable in elevational measurements through reflected beams. U.S. Pat. No. 3,911,589 is directed to a base having an adjustable horizontal frame for supporting a vertical rod within a vertical passageway; the adjustment for verticality includes a plurality of laterally extended threadedly engaged hand wheels.

SUMMARY OF THE PRESENT INVENTION

The present invention is directed to a self supporting portable stand for easily adjustably locating a surveyor's prism rod vertical over a point on the ground, which stand can be carried from location to location with the rod attached. The stand includes a fixed tripod supporting, via retaining elements, a positionally lockable captured ball or sphere. The rod is detachably attached to and supported by the sphere, which sphere is rotatable within the retaining elements to locate the rod vertically aligned. Upon locking the sphere in place, the rod is maintained vertical. The sphere also accommodates either an extension member from the rod or a plumb line attached to the sphere to permit alignment of the rod with a predetermined point on the ground.

It is therefore a primary object of the present invention to provide a portable self supporting stand for maintaining vertical a surveyor's rod.

Another object of the present invention is to provide a tripod supported captured sphere mechanism for receiving and positionally maintaining a surveyor's rod.

Still another object of the present invention is to provide a stand for positionally maintaining a surveyor's rod and for accommodating an extendable member of the rod to the point of interest on the ground.

Yet another object of the present invention is to provide a stand for a surveyor's rod which is portable with the rod attached fromn location to location.

A further object of the present invention is to provide a tripod supported and captured sphere for vertically supporting a surveyor's rod and for supporting a depending functional extension member of the rod extending to the point of interest on the ground.

A yet further object of the present invention is to provide a lightweight and field use compatible stand for a surveyor's rod.

A still further object of the present invention is to provide a surveyor's rod with an extendable member for contacting a point of interest on the ground beneath a rod supporting stand.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a perspective view of the present invention;

FIG. 1a is a top view of a tripod usable with a surveyor's rod stand;

FIG. 2 is a partial cross sectional view illustrating the angularly adjustable rod supporting mechanism;

DESCRIPTION OF THE INVENTION

Figure 3:
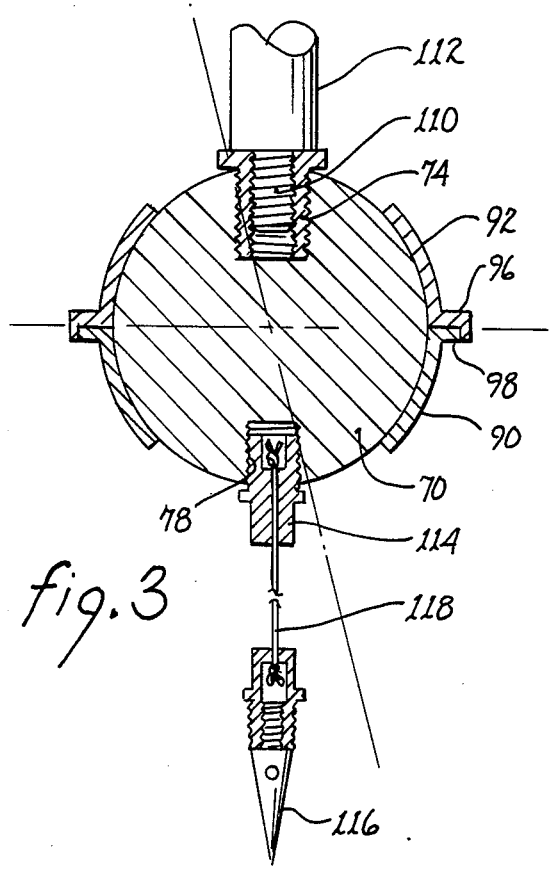
FIG. 3 illustrates a variant of the sphere illustrated in FIG. 2.
Figure 4:
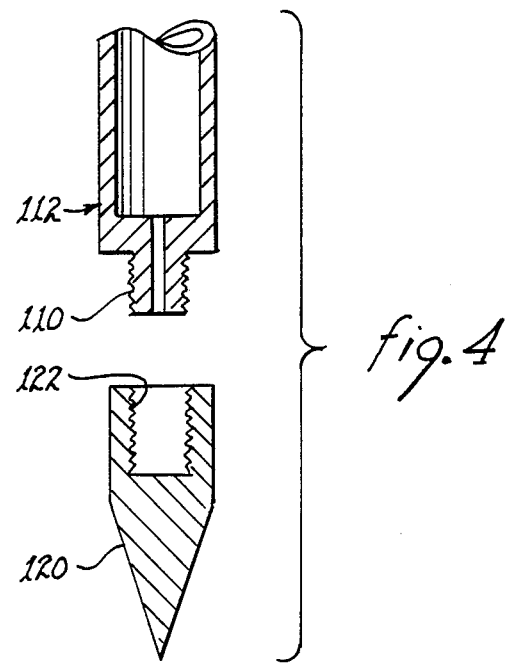
FIG. 4 illustrates a detachable tip for the surveyor's rod.
Figure 5:
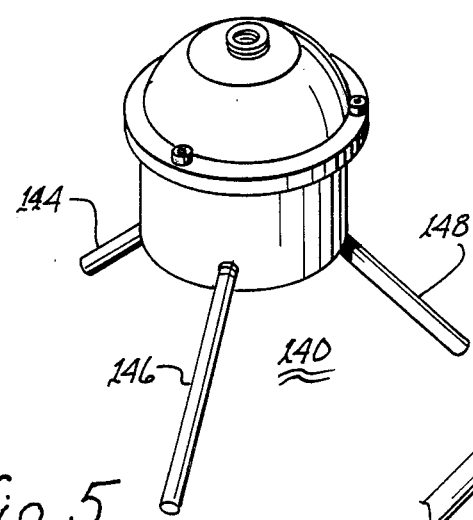
FIG. 5 is a perspective view of a variant stand.
Figure 6:
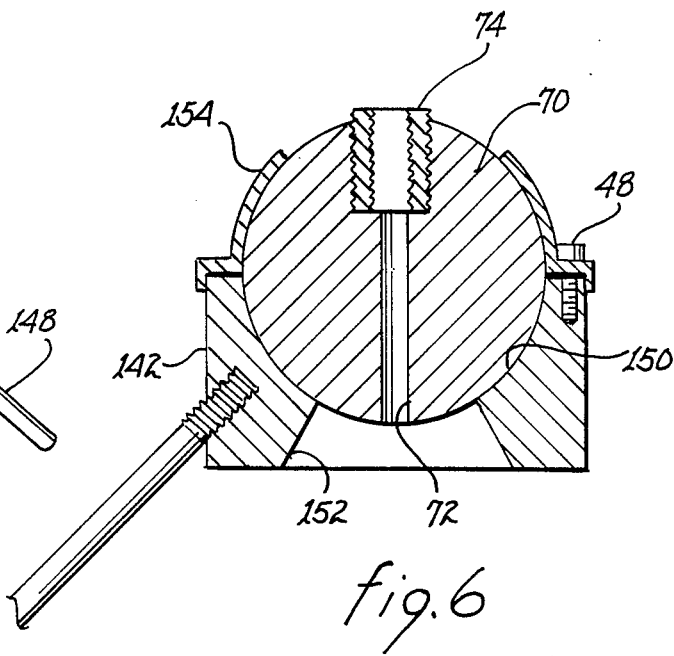
FIG. 6 is a cross sectional view of the variant stand.

Referring to FIG. 1, there is illustrated a stand 10 for supporting a surveyor's rod 12. The rod may include a prism or reflector 14 threadedly attachable to threaded shaft 16 extending upwardly from section 18 of the rod. Alternatively, elements other than a prism or a reflector could be used in conjunction with section 18, depending upon the nature and type of work being performed with rod 12. Section 18 is in telescoping engagement with section 20. The degree of extension of section 18 from section 20 is adjustable and may be fixed by a collar 22 frictionally engaging or otherwise clamping section 18 to prevent longitudinal movement of the section. A tip or extension member 24 extends downwardly from the central part of stand 10. This member is attached to section 18 and is extended or retracted upon commensurate movement of section 18 relative to section 20. Upon extending member 24, it comes in contact with the point of interest on ground 26 with respect to which a surveying related measurement is to be made.

Stand 10, as illustrated in FIGS. 1 and 1a, includes a tripod 30 supporting a captured ball or sphere, referred to by numeral 32. The tripod may be formed by three identical legs welded to one another with each leg being secured to captured sphere 32. More specifically, each of legs 34, 36 and 38 may include a base segment 40 having a leg segment 42 extending downwardly at an obtuse angle therefrom and an upper segment 44 folded back upon the base segment to define an acute angle therewith. End 46 (see FIG. 2) is configured to be engaged by bolt means 48 to interconnect the end with captured sphere 32. Base segment 40, at a location close to the junction with its upper segment 44, is welded to base 40 of another leg close to its junction with leg segment 42, as illustrated. By inspection, it will become apparent that legs 34, 36 and 38 may be identical with one another and secured to one another to form a rigid and robust tripod for supporting captured sphere 32.

Referring particularly to FIG. 2 further details attendant rod 12 and captured sphere 32 will be described. Segment 18 is telescopingly and axially translatable with respect to segment 20 to extend or contract the length of rod 12. Fixed positioning of segment 18 with regard to segment 20 may be effected by compressing a compressible member 50 captured within collar 22. The collar is in threaded engagement with segment 12 to accommodate compression and expansion of the member. Thereby, the relative positioning of segment 18 may be fixed and varied at will. Lower end 52 of segment 18 includes a threaded cavity 54. Extension member 24 includes a threaded stud 56 for threaded engagement with cavity 54. Thereby, member 24 may be disengagably engaged with segment 18. The lower end of section 20 includes a threaded boss 58. A passageway 60 extends through the boss for accommodating translatory movement of member 24 therethrough. Accordingly, member 24 may be extended from or retracted within segment 20 upon commensurate translatory movement of segment 18. Ball or sphere 70 includes a diametrically extending passageway 72 for accommodating translation of member 24 therethrough. Upper end of passageway 72 may be expanded and threaded to receive threaded boss 58 of rod 12. Alternatively, an insert 74 may be in threaded engagement with an expanded threaded annular section of passageway 72, as illustrated. Insert 74 includes internal threads for threadedly receiving boss 58. The lower end of passageway 72 may include an annularly expanded threaded cavity 78. In the configuration of captured sphere 32 illustrated, a threaded sleeve 80 may be in threaded engagement with cavity 78 to accommodate translation of member 24 therethrough and provide lateral support to the member.

Captured sphere 32 includes a pair of opposed annular bands 90, 92 for retaining sphere 70 therewithin. These bands include flanges 94, 96, respectively. These flanges, upon being drawn toward one another, cause a clamping of sphere 70 between the opposed annular bands to retain the sphere fixedly captured and positioned with respect to the annular bands. Bolt means 48, penetrably engages flanges 94, 96 and end 46 of each of upper segments 44 of tripod 30.

To minimize intrusion of dust, dirt and other contaminant intermediate the annular bands and the sphere, a dust cover 100 extends radially from about the base of rod 12 adjacent sphere 70 to an overlapping relationship with annular band 92. Support for the dust cover may be provided by a boss extending from the sphere, which boss includes expanded threaded cavity 76. Alternatively, as illustrated, insert 74 may include a radially extending shoulder 102 for retaining dust cover 100 adjacent the underlying surface of sphere 70 or for retaining the dust cover in spaced relationship with regard to the sphere to accommodate movement of the annular band 92 intermediate the dust cover and the sphere. A second dust cover may be similarly secured to the lower part of sphere 70.

By loosening bolt means 48, sphere 70 may be rotated with respect to tripod 30 to position rod 12 vertically with regard to a predetermined point on the ground. Thereafter, bolt means 48 are tightened to clamp sphere 70 in place and thereby fixedly position rod 12. As a matter of practice, the sphere is clamped only sufficiently to apply enough friction to retain the rod against unwanted movement but permit repositioning of the sphere and realignment of the rod without repeated loosening and tightening of bolt means 48.

Referring to FIG. 3, there is illustrated a variant in the structure depicted in FIG. 2 along with a variation in the mode of operation of the present invention. All surveyor's rods have, as standard practice, a fixed $\frac{5}{8}''$ by 11 threaded boss 110 disposed at the lower end of the rod, such as rod 112. In the event rod 112, which does not include the capability for extending a member 24 therefrom is used, boss 110 is threadedly engaged with sphere 70 by engaging its threaded cavity, as discussed above, or by threadedly engaging insert 74, as illustrated in FIG. 3. The sphere may have a passageway 72 extending therethrough, as illustrated in FIG. 2, or it may be devoid of such passageway, as illustrated in FIG. 3. To correlate rod 112 with the point of interest on the ground, threaded plug 114 is threaded into expanded threaded cavity 78. The plug includes a plumb bob 116 depending from the plug via a cord 118. The length of the cord can be adjusted as necessary to locate the plumb bob in contact with or close to the point of interest on the ground. It may be noted that plug 78 may be secured to the configuration of sphere 70 shown in FIG. 2 after removal of sleeve 80; accordingly, the plumb bob may be used in place of member 24.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A portable stand for a surveyor's rod having a longitudinal axis, said stand comprising in combination:

(a) a tripod for placement upon the surface of interest;
(b) an omnidirectionally rotatable captured element for supporting the rod;
(c) means for attaching said captured element to said tripod;
(d) means for securing the rod to said captured element; and
(e) means for positionally stabilizing said captured element to retain the rod in a predetermined alignment.

2. The portable stand as set forth in claim 1 including means extending from said captured element to a predetermined point on the ground as an axially aligned extension of the longitudinal axis of the rod.

3. The portable stand as set forth in claim 2 wherein said extending means is detachably attachable to said captured element.

4. The portable stand as set forth in claim 3 wherein said extending means is a plumb bob and plumb line.

5. The portable stand as set forth in claim 1 wherein the rod includes an extendable member extending from said captured element in alignment with a predetermined point on the ground as an axially aligned extension of the longitudinal axis of the rod and wherein said captured element includes a passageway for translatably receiving said member.

6. The portable stand as set forth in claim 5 wherein the rod includes means for locking said member at a predetermined extension from the rod.

7. The portable stand as set forth in claim 6 wherein the rod is hollow to accommodate said member during retraction and includes a closed lower end having an aperture for penetrably receiving said member upon extension of said member.

8. The portable stand as set forth in claim 5 wherein said member is of sufficient length to extend from said captured element to a point of interest on the ground.

9. The portable stand as set forth in claim 1 wherein said captured element includes a pair of opposed annular bands for capturing said captured element therebetween.

10. The portable stand as set forth in claim 9 including means for drawing said pair of annular bands toward one another to clamp immovably said captured element therebetween.

11. The portable stand as set forth in claim 9 including at least one dust cover for restraining intrusion of foreign matter between at least one annular band of said pair of annular bands.

12. The portable stand as set forth in claim 9 including a first dust cover for restraining intrusion of foreign matter between one annular band of said pair of annular bands and a second dust cover for restraining intrusion of foreign matter between the other annular band of said pair of annular bands.

13. The portable stand as set forth in claim 10 wherein said captured element is a sphere.

14. The portable stand as set forth in claim 13 wherein said securing means includes a cavity disposed in said sphere for receiving an end of the rod.

15. The portable stand as set forth in claim 14 wherein the rod includes a selectively extendable member and wherein said sphere includes a passageway for receiving said member.

16. The portable stand as set forth in claim 15 wherein the rod includes means for locking said member at a predetermined extension of the rod.

17. The portable stand as set forth in claim 16 wherein said member is of sufficient length to extend from said sphere to a point of interest on the ground.

18. The portable stand as set forth in claim 1 wherein said tripod includes three fixed length legs.

19. The portable stand as set forth in claim 18 wherein each of said legs is identical to the other legs.

20. The portable stand as set forth in claim 19 wherein each of said legs includes a base segment, a leg segment extending from one end of said base segment at an obtuse angle and an upper segment extending from another end of said base segment at an acute angle.

21. A method for supporting a surveyor's rod in vertical alignment with a point of interest on the ground, said method comprising the step of
(a) placing a tripod upon the surface of interest;
(b) supporting the rod with an omnidirectionally rotatable captured element secured to the tripod; and
(c) stabilizing the captured element to align vertically the rod with the point of interest on the ground.

22. The method as set for the claim 21 wherein the rod includes an upper end and a lower end and wherein said supporting step includes the step of attaching the lower end of the rod to the captured element.

23. The method as set for the claim 22 wherein the rod includes a member selectively extendable from the lower end of the rod and wherein said step of supporting includes the step of extending the member through the captured element to the point of interest on the ground.

24. The method as set for the claim 23 wherein said step of extending includes the step of releasing the member with respect to the rod to permit axial translation of the member relative to the rod.

25. The method as set forth in claim 21 wherein said stabilizing step includes the step of clamping the captured element.

* * * * *